(12) United States Patent
Hill et al.

(10) Patent No.: US 10,764,363 B2
(45) Date of Patent: Sep. 1, 2020

(54) NETWORK PEERING DISCOVERY SYSTEM AND METHOD

(71) Applicant: ORACLE INTERNATIONAL CORPORATION, Redwood Shores, CA (US)

(72) Inventors: Peter J. Hill, Seattle, WA (US); Sushant Mantri, Bothell, WA (US); Tal Altman, Puyallup, WA (US)

(73) Assignee: Oracle International Corporation, Redwood Shores, CA (US)

(*) Notice: Subject to any disclaimer, the term of this patent is extended or adjusted under 35 U.S.C. 154(b) by 26 days.

(21) Appl. No.: 16/256,155

(22) Filed: Jan. 24, 2019

(65) Prior Publication Data
US 2020/0244727 A1    Jul. 30, 2020

(51) Int. Cl.
*H04L 29/08* (2006.01)
*H04B 10/00* (2013.01)

(52) U.S. Cl.
CPC ......... *H04L 67/1068* (2013.01); *H04B 10/12* (2013.01); *H04L 67/1021* (2013.01); *H04L 67/18* (2013.01)

(58) Field of Classification Search
CPC . H04L 67/1068; H04L 67/1021; H04L 67/18; H04B 10/12
USPC ....................................................... 709/223
See application file for complete search history.

(56) References Cited

U.S. PATENT DOCUMENTS

| | | |
|---|---|---|
| 6,393,290 B1 | 5/2002 | Ufongene |
| 6,885,997 B1 | 4/2005 | Roberts |
| 7,912,732 B1 | 3/2011 | Cahn |
| 8,612,283 B1 | 12/2013 | Belanger et al. |
| 8,724,781 B2 | 5/2014 | Sunder et al. |

(Continued)

FOREIGN PATENT DOCUMENTS

EP    2113872 A1    11/2009

OTHER PUBLICATIONS

Farrel et al., Inter-Domain MPLS and GMPLS Traffic Engineering, Resource Reservation Protocol—Traffic Engineering (RSVP-TE) Extensions; Feb. 2008; pp. 1-33, Copyright—The IETF Trust.

(Continued)

*Primary Examiner* — Nicholas R Taylor
*Assistant Examiner* — Chong G Kim
(74) *Attorney, Agent, or Firm* — Kraguljac Law Group, LLC

(57) ABSTRACT

Systems, methods, and other embodiments associated with network peering discovery are described. In one embodiment, a method includes receiving, and storing in a data structure, a customer location where a customer terminal is located, and platform information identifying a multi-tenant platform. A network exchange point is identified, and includes network hardware where a physical network connection to the multi-tenant platform is to be established for the customer terminal. If a distance separating the network exchange point from the customer location does not exceed a threshold, the data structure is modified to include a local network connection between the network exchange point and the customer terminal. If the distance exceeds the threshold, the data structure is modified to include a third-party network between the customer terminal and the network exchange point. The modified data structure is transmitted to a remote computer terminal to control creation of a peer connection.

20 Claims, 6 Drawing Sheets

(56) References Cited

U.S. PATENT DOCUMENTS

| | | |
|---|---|---|
| 9,323,872 B2 | 4/2016 | Forbes et al. |
| 2012/0164988 A1 | 6/2012 | Jordan, Jr. |
| 2014/0278808 A1 | 9/2014 | Iyoob et al. |
| 2016/0142256 A1 | 5/2016 | Yang et al. |

OTHER PUBLICATIONS

Awduche et al., RSVP-TE: Extensions to RSVP for LSP Tunnels; Dec. 2001; pp. 1-73, Copyright—The Internet Society.

Awduche et al., Requirements for Traffic Engineering Over MPLS; Sep. 1999; pp. 1-33; Copyright—The Internet Society.

Rosen et al., Multiprotocol Label Switching Architecture; Jan. 2001; pp. 1-74; Copyright—The Internet Society.

Eurofiber Belgium, Managed Dark Fibre; 2017; pp. 1-5; downloaded on Jan. 22, 2019 from: https://www.eurofiber.be/en/services/managed-dark-fiber/.

About 2CONNECT, Compare Leased Line Costs and Leased Line Quotes, Dec. 15, 2017; pp. 1-7; downloaded on Jan. 22, 2019 from: https://www.leasedlineandmpls.co.uk/.

Patent Cooperation Treaty (PCT) International Search Report and Written Opinion issued in PCT International Application No. PCT/US2020/014513, International Filing Date Jan. 22, 2020 having a Notification Date of Apr. 28, 2020.

CUSTOMER INFORMATION

405 →

STATE: 425 ▶   ZIP CODE: 420

OR

NEAREST CITY: 430 ▶

DESIRED PERFORMANCE

410 →

MIN. BANDWIDTH: 435 ▶   MAX. LATENCY: 440 ▶

PLATFORM INFORMATION

415 →

CLOUD: 445 ▶

SUBMIT

NETWORK PEERING DISCOVERY SYSTEM AND METHOD

BACKGROUND

Cloud service providers offer a variety of cloud computing resources based on software hosted by servers. The software is accessible by remotely-located client terminals over a communication network. The servers, optionally along with a network exchange point, storage device or other hardware, are located at one or more Points of Presence, each of which is referred to as a "PoP." Each PoP is a facility where physical network connections to the servers of the respective cloud service provider can be established. The PoPs are distributed at geographic locations throughout a service area with the goal of positioning at least one PoP in close proximity to as many potential customers as possible.

Despite the diverse geographic locations of the PoPs, there are many customers that are not located close enough to locally connect directly to a PoP for one or more cloud service providers. For example, Oracle Cloud Resources deploys a network of PoPs that offer privately routed inter-region connectivity. Such a network is private, and provides consistent inter-regional performance in terms of low latency and jitter, and reliable bandwidth relative to the public Internet. But there is a practical limit to the number of PoPs that can be constructed, leaving some potential customers hundreds or even thousands of miles away from the closest PoP.

Potential customers seeking to connect to a cloud service provider often lack sufficient information to establish the requisite network connections. For example, a corporate entity in one city is unlikely to know whether a cloud service provider of interest has a PoP nearby to which a server associated with the corporate entity can be locally connected. Further, the corporate entity is also unlikely to know what network service providers operate networking resources locally, to establish a connection with a locally-accessible PoP. The corporate entity is even less likely to have knowledge of any third parties that operate intermediary networking resources that are not local to either the corporate entity or the cloud service provider.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 4 illustrates an embodiment of a graphical user interface served by a peering system for receiving user-input parameters for constructing a peer connection.

DETAILED DESCRIPTION

Figure 1:
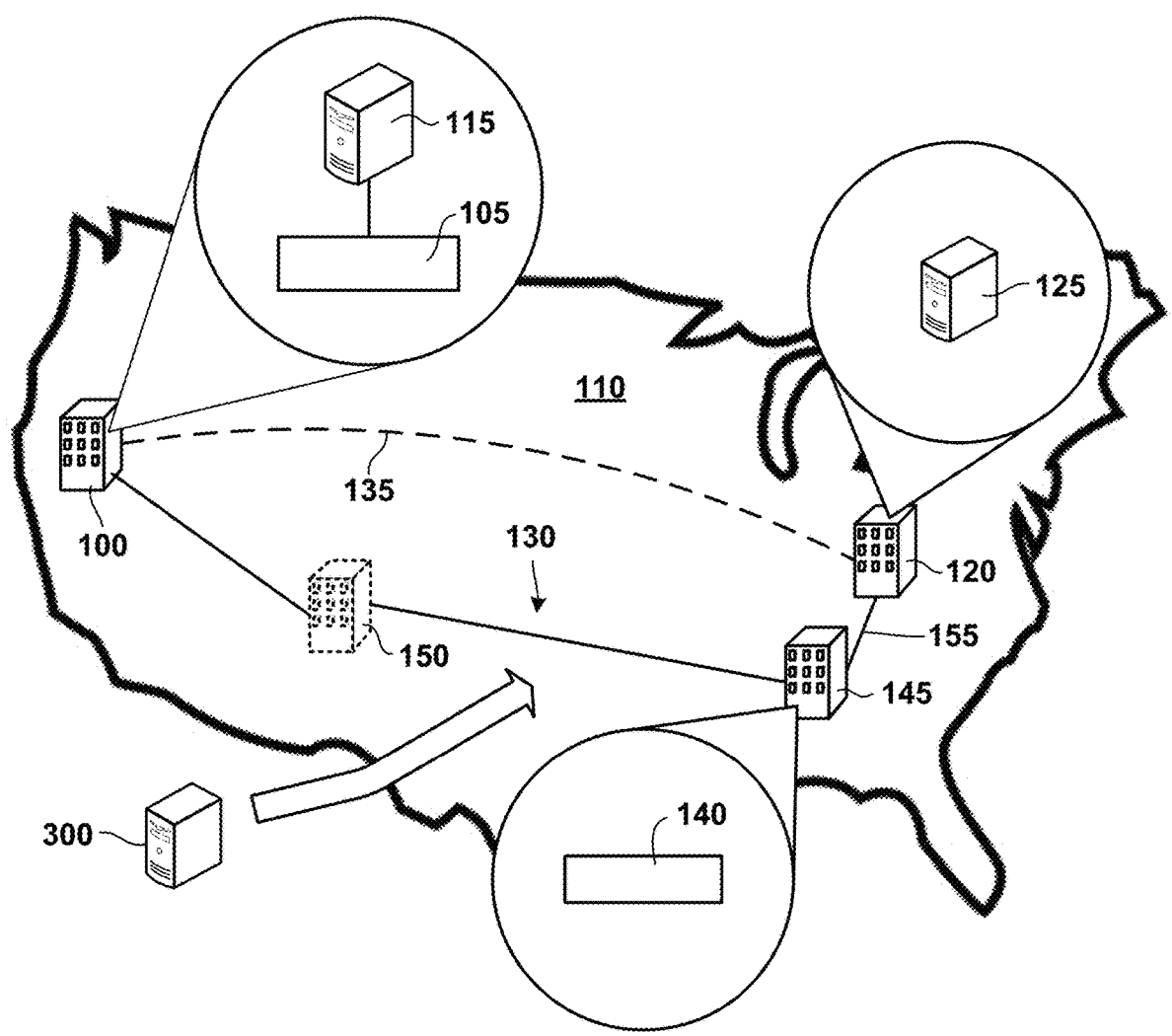
FIG. 1 is an illustrative arrangement of PoPs within a geographic region.

The present disclosure involves a network peering discovery system and method. There are many network service providers that operate fiber-optic networks connecting one building to another, or one building to a service. However, there is presently no way to reliably select suitable network resources for creating a peer connection between a customer terminal and a network exchange point of a cloud service provider.

The available network resources that can be selected and utilized for creating a peer connection are numerous. These network resources exhibit different properties such as bandwidth, network latency, cost, etc. However, "last-mile" network resources such as wireless communication channels connected to the customer terminal may not have adequate capacity, exhibit acceptable network latency, or may be expensive. Dark fiber, or underutilized fiber optic lines, in close proximity to the customer location may offer the customer terminal an improved network communication ability compared to existing last-mile resources. For example, available dark fiber may offer greater bandwidth, may be more secure, and available for use at a lower cost than wireless communication channels. However, the availability of existing dark fiber resources is often unknown to the customer and the cloud service provider.

The public Internet can also be used exclusively as an economic and practical alternative for network communications between a cloud service provider and the customer terminal. However, using the public Internet as a sole communication network between such entities can create a security risk for sensitive communications. Further, the ability to communicate exclusively over the public Internet can be hampered by spikes in Internet traffic during peak times, introducing network latency into network communications.

The disclosed network peering system and method control the inclusion of network resources in a third-party network to create a peer connection between a multi-tenant platform of a cloud service provider and a customer terminal. The network resources can be selected based on customer information input into the system such as an address, GPS coordinates, zip code, or other information indicative of a customer location where a customer terminal is located. Platform information indicative of a cloud service provider to which the customer terminal is to be connected can also be input.

A local PoP housing an intermediate network exchange point located nearest the customer terminal can be selected based on the customer location. A local network connection can be established by selecting dark fiber between the customer terminal and the intermediate network exchange point of the local PoP. Third-party network resources are progressively selected to grow the third-party network from the local PoP, toward a PoP that includes a network exchange point for the multi-tenant platform ("Cloud PoP").

The local PoP or intermediate network exchange point can optionally be selected for inclusion in the peer connection before the third-party network resources between the local PoP and the Cloud PoP. A data structure comprising the identity of the local PoP, the Cloud PoP, and the third-party network resources can be generated. The peer connection having the desired qualities can then be created and rendered operational based on the information included in the data structure.

Growing the third-party network from the local PoP toward the Cloud PoP improves the bandwidth, security, and possibly other qualities of the peer connection compared to growing the third-party network in the other direction. For example, growing the third-party network from the Cloud PoP may involve selecting the Cloud PoP for the cloud service provider that is nearest the customer terminal. Third-party network resources known to the cloud service provider can then be selected to form a communication network between the Cloud PoP and the customer terminal. The third-party network resources selected, however, may include communication channels forming a portion of the public Internet, which may lack the security of a private fiber cable. Further, the cloud service provider has limited knowledge of the network resources available in many markets where customer terminals may be located. Thus, the selected network resources may also include communication channels having undesirable bandwidth, latency, or other properties, when dark fiber may be available near the customer location. As a result, the selected network resources would form a slow peer connection and/or a peer connection that suffers from considerable network latency.

With reference to the drawings, FIG. 1 shows an illustrative arrangement of a Cloud PoP 100 housing a network exchange point 105 at a first location within a geographic region 110, illustrated as the United States in FIG. 1. The network exchange point 105 includes network hardware where a physical network connection to a multi-tenant platform 115 can be established. Examples of the network hardware can include Ethernet switches, routers, optical fiber patch panels, or other such physical networking infrastructure utilized to establish a physical network connection.

A customer location 120, shown as an office building in FIG. 1, houses a customer terminal 125 that is located remotely from the Cloud PoP 100, in a different region of the geographic region 110. The customer terminal 125 can be a server affiliated with a corporate entity, for example, and can exchange data or documents with the multi-tenant platform 115, or access resources hosted by the multi-tenant platform 115.

Communications between the multi-tenant platform 115 and the customer terminal 125 are to occur over a peer connection 130 established by the peering system and method described herein. A plurality of user terminals can be operatively connected to the customer terminal 125 via a private, secure network such as a local area network ("LAN") at the customer location 120, a wide area network ("WAN"), or a combination thereof. The connected user terminals can utilize one or more resources hosted by the multi-tenant platform 115 through the customer terminal 125. Examples of user terminals include, but are not limited to desktop computers, laptop computers, notebook computers, tablet computers, personal digital assistants (PDAs), smart phones, cell phones, and consumer electronic devices incorporating one or more computing device components such as one or more processors, central processing units (CPU), or controllers, etc.

The peer connection 130 is to be established by a peering system 300, described below in FIG. 3, between the customer terminal 125 at the customer location 120 and the multi-tenant platform 115. However, the customer location 120 is too distant from the Cloud PoP 100 where the network exchange point 105 for the cloud service provider is located for a direct peer connection to be established.

For example, a secure, direct peer connection 135, shown as broken lines in FIG. 1, between the customer terminal and the network exchange point 105 may not be feasible or practical. The Cloud PoP may be located in a different state than the customer location 120, or separated by tens, hundreds or even thousands of miles from the customer location 120. Continuous, uninterrupted fiber optic cables or lines that are underutilized and have the capacity to form the peer connection 135 may not exist or may be unavailable. The cost to install such fiber optic lines may be cost prohibitive to the customer or cloud service provider.

As another example, the Cloud PoP may be located further from the customer location 120 than an intermediate network exchange point 140 housed within a regional PoP 145 near the customer location 120. The intermediate network exchange point 140 may be located in the same city, county or state as the customer location 120. Or, the intermediate network exchange point 140 may be located in a different city, county or state from the customer location 120. However, the distance separating the intermediate network exchange point 140 from the customer location 120 is less than the distance separating the Cloud PoP from the customer location 120.

The regional PoP 145 or the intermediate network exchange point 140 can be owned, maintained or operated by a third party, other than the customer and the cloud service provider. Dark fiber may be installed, and available to form a portion of the peer connection 130 extending between the customer location 120 and the regional PoP. A direct, private (limited to the customer) and secure connection can be formed by utilizing the existing dark fiber between the customer terminal 125 at the customer location 120 and the intermediate network exchange point 140. Depending on the availability of high-bandwidth network resources such as dark fiber between the regional PoP 145 and the Cloud PoP 100, one or more additional PoPs 150 housing another network exchange point may also be included in the peer connection 130 established as described herein.

Figure 2:
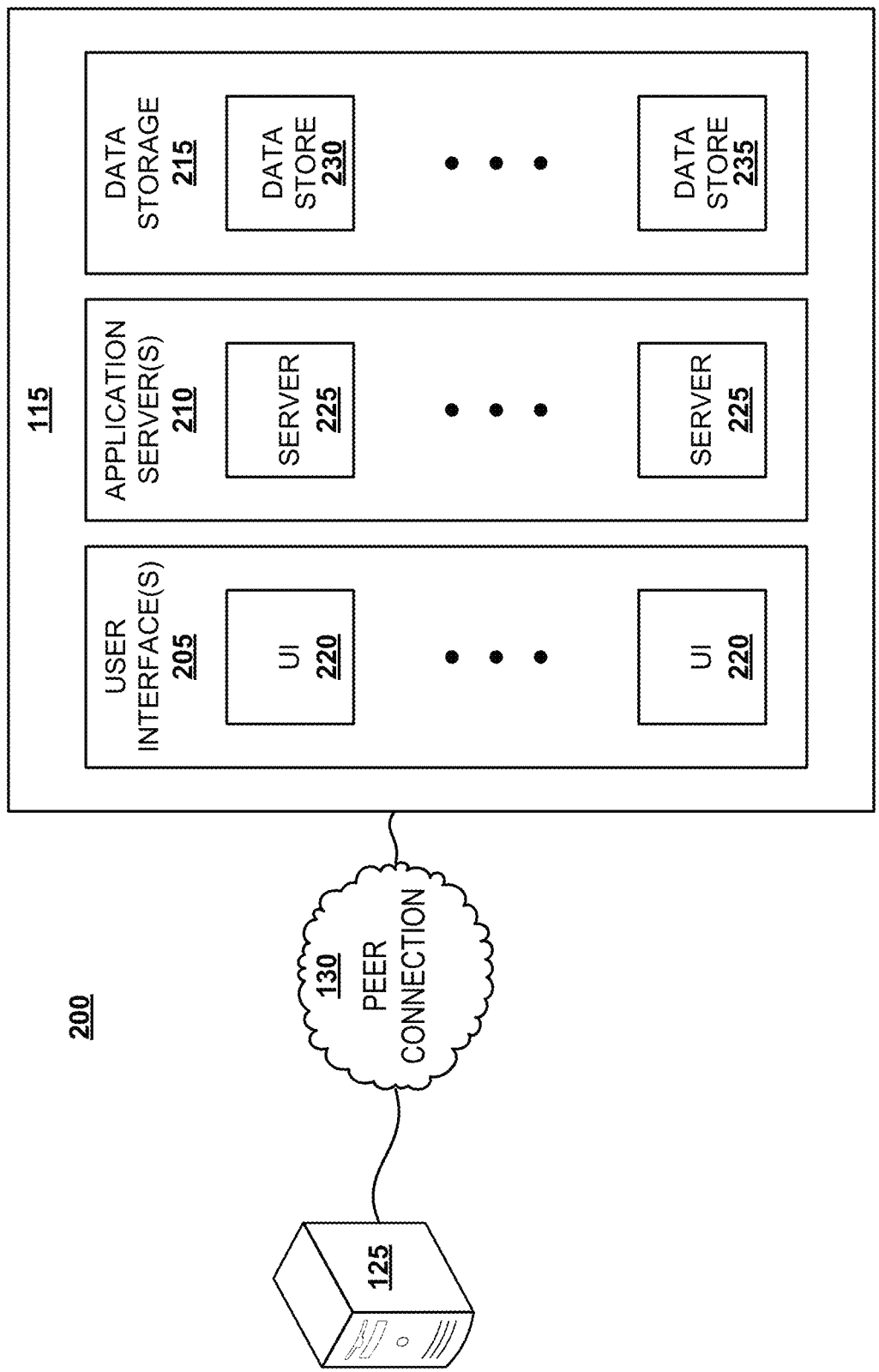
FIG. 2 illustrates an environment including a customer terminal operatively connected to a multi-tenant platform via a peer connection.

FIG. 2 illustrates an environment 200 that includes the customer terminal 125 connected to the multi-tenant platform 115 via the peer connection 130. The multi-tenant platform 115 can include multiple processing tiers or layers, including a user interface layer 205, an application layer 210, and a data storage layer 215. The user interface layer 205 may maintain multiple user interfaces 220, including graphical user interfaces and/or web-based interfaces. The user interfaces 220 may include a default user interface for the platform (e.g., an administrative UI), as well as one or more user interfaces extended by one or more tenants of the system (e.g., via access to one or more APIs).

Each tier or layer may be implemented with a set of computers and/or computer components including computer servers and processors, and may perform various functions, methods, processes, or operations as determined by the execution of a software application or set of instructions hosted by the multi-tenant platform 115. For example, the application layer 210 can include one or more application servers 225 that each store an application module for serving content over the peer connection 130 to the customer terminal 125.

The data storage layer 124 may include one or more production data stores 230 and one or more testing, validation and/or backup data stores 235. Data stores may be implemented with any suitable data storage technology including structured query language ("SQL") based relational database management systems ("RDBMS"). Being multi-tenant, the multi-tenant platform 115 hosts content and services that can concurrently be accessed by the customer terminal 125 and a plurality of additional customer terminals.

Figure 3:
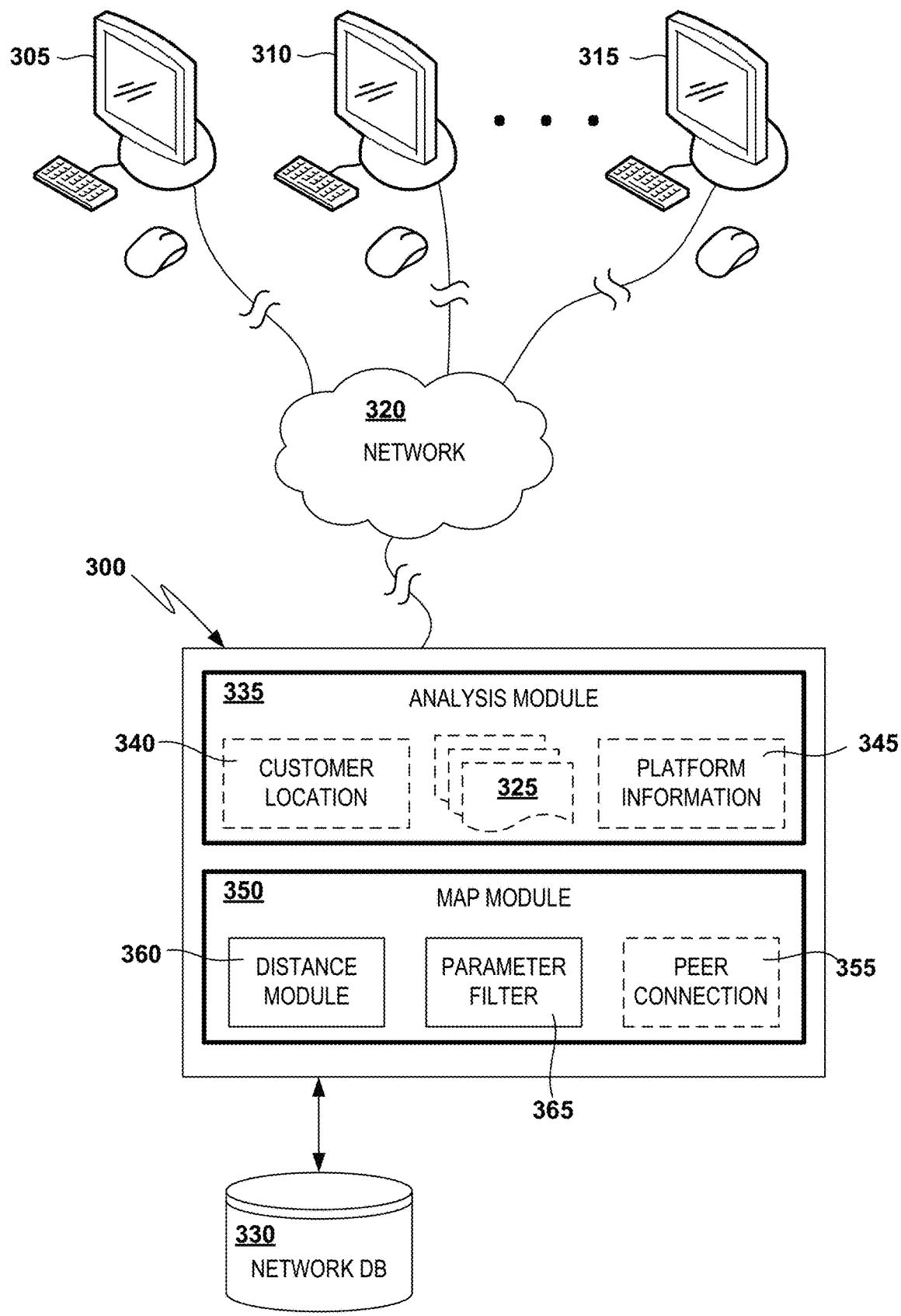
FIG. 3 illustrates one embodiment of a cloud-based peering system for constructing a peer connection between a customer terminal and a network exchange point for a cloud service provider.

With reference to FIG. 3, one embodiment of a cloud-based peering system 300 associated with creating a peer connection 130 between the customer terminal 125 and the Cloud PoP 100 is shown. The peering system 300 is operatively connected to communicate with a plurality of client terminals 305, 310, 315 over a communication network 320, such as the Internet. The client terminals 305, 310, 315 can communicate with the peering system via standardized Internet Protocol Suite (TCP/IP), for example. According to one embodiment, the client terminals 305, 310, 315 or the peering system 300 can be a computing device 600, as shown and described with reference to FIG. 6, for example.

The peering system 300 maintains one or more data structures 325 that define graphical user interfaces. In response to receiving a request from one of the client terminals (such as client terminal 305) over the network 320, the peering system 300 serves content to the requesting terminal 305. The served content causes the requesting terminal 305 to display one or more graphical user interfaces to be displayed by the requesting terminal 305 for receiving user input. The received user input is transmitted by the requesting terminal 305 to the peering system 300, to be used for creating the peer connection 130.

For example, FIG. 4 shows an illustrative embodiment of a graphical user interface 400 served by the peering system 300. The graphical user interface 400 can be displayed by a suitable application executing on the requesting terminal 305. An example of the suitable application includes, but is not limited to, a web browser application (e.g., Microsoft Internet Explorer, Mozilla Firefox, Google Chrome, etc.).

The graphical user interface 400 includes data entry tools that allow the user to enter parameters desired of the peer connection 130 to be constructed. In the illustrated embodiment, the graphical user interface 400 includes a customer information interface 405, a performance interface 410, and a platform interface 415.

The customer information interface 405 includes a zip field 420 in which the user can free type the numerical zip code of the customer location 120 (FIG. 1). Although the zip code is described as an example of the text that can be entered into the zip field 420, other embodiments of the zip field 420 can receive GPS coordinates, a street address, or any other information indicative of the customer location 120.

According to one embodiment, the customer information interface 405 can optionally include a state pull down menu 425 and a city pull down menu 430. The user can select the state in which the customer location 120 is found from a finite number of selectable options. Selection of the state from the state pull down menu 425 can optionally filter the list of options selectable from the city pull down menu 430 to a finite number of cities within the selected state. The options presented in the city pull down menu 430 can be limited to only those cities within the selected state that are known to have local, direct access to a PoP via available dark fiber. For example, the cities in the city pull down menu 430 can be limited to cities in the selected state in which dark fiber exists, and is available for a local connections to customer locations in those cities. The cities having such network resources can be maintained in a database 330 (FIG. 3) accessible to the peering system 300, described below.

The performance interface 410 includes one or more fields that are configured to receive performance characteristics of the peer connection 130 desired by the user. For example, a bandwidth pull down menu 435 allows the user to select a minimum bandwidth threshold of the peer connection 130 desired. The selectable options can include discrete minimum bandwidth values, or ranges of acceptable bandwidth values.

As another example, the performance interface 410 can include a latency pull down menu 440. The latency pull down menu 440 can be populated with maximum acceptable latency limits. Selection of a latency limit from the latency pull down menu 440 defines the longest permissible time for data to be transmitted over the peer connection 130 between the customer terminal 125 and the network exchange point 115 for the cloud service provider.

The platform interface 415 includes at least one cloud field 445 that allows the user to input the cloud service provider to be connected to the customer terminal 125 by the peer connection 130. The cloud field 445 can include a pull down menu populated with a plurality of selectable cloud service providers maintained in the database 330. The plurality of selectable cloud service providers maintained in the database can be limited to providers for which the location of at least one associated Cloud PoP is included in the database.

Although the fields are described above as including a text entry field, or a field populated from a pull down menu, the present disclosure is not so limited. Each field can independently be configured to receive user-defined information governing one or more aspects of the peer connection 130 according to any suitable entry mechanism. Once the parameter(s) of interest are input to the respectable field(s), selection of a submit control 450 transmits the user-input information to the peering system 300 over the network 320.

Referring once again to FIG. 3, the peering system 300 receives the information submitted in response to selection of the submit control 450. An analysis module 335 of the peering system 300 receives the transmitted customer information 340 indicating where the customer terminal 125 is located. The analysis module 335 also receives the platform information 345 identifying the multi-tenant platform 115 to which the customer terminal 125 is to be connected via the peer connection 130, and any performance information input to the performance interface 410.

In one embodiment, one or more of the components described herein are configured as program modules stored in a non-transitory computer readable medium. The program modules are configured with stored instructions that when executed by at least a processor cause the computing device to perform the corresponding function(s) as described herein.

Based on the received customer information 340 and platform information 345, the analysis module 335 identifies the network exchange point 105 where a physical network connection to the multi-tenant platform 115 is to be established for the customer terminal 125. In the event more than one network exchange point 105 exists for the multi-tenant platform 115, the analysis module 335 can select the network exchange point 105 nearest the customer location 120.

The identified network exchange point 105, the received customer information 340 and the received platform information 345 is stored in one or more of the data structures 325 for the customer location by the analysis module 335.

The peering system 300 also includes a map module 350. The map module is configured to generate or modify a data structure 355 to include details about the peer connection 130 to be created. Generally, the map module 350 includes a distance module 360 configured to determine whether a direct or indirect peer connection 130 is to be created between the customer terminal 125 and the Cloud PoP or network exchange point 105 for the multi-tenant platform 115 identified by the analysis module 335.

Depending on whether a direct or indirect peer connection 130 is to be created, the map module 350 can identify third-party network service providers that can be utilized to create the direct or indirect peer connection 130. A filter 365 is operable to limit the third-party network service providers, and their respective network resources, returned to providers of resources that satisfy any performance criteria submitted by the user via the performance interface 410.

The database 330 can be maintained to include at least a plurality of cloud service providers, and the location of at least one network exchange point for each cloud service provider. Additionally, the database 330 can store one or more third-parties (e.g., other than the cloud service provider of interest to the user and the customer) that own, operate or otherwise have an interest suitable to control allocation of dark fiber, PoPs, and other networking resources in different geographic regions. The records for the networking resources in the database 330 can be tagged or otherwise associated with location information. Based on the location information, a query of the database 330 for networking resources near a customer location can filter resources that are inaccessible from the customer location.

Figure 5:
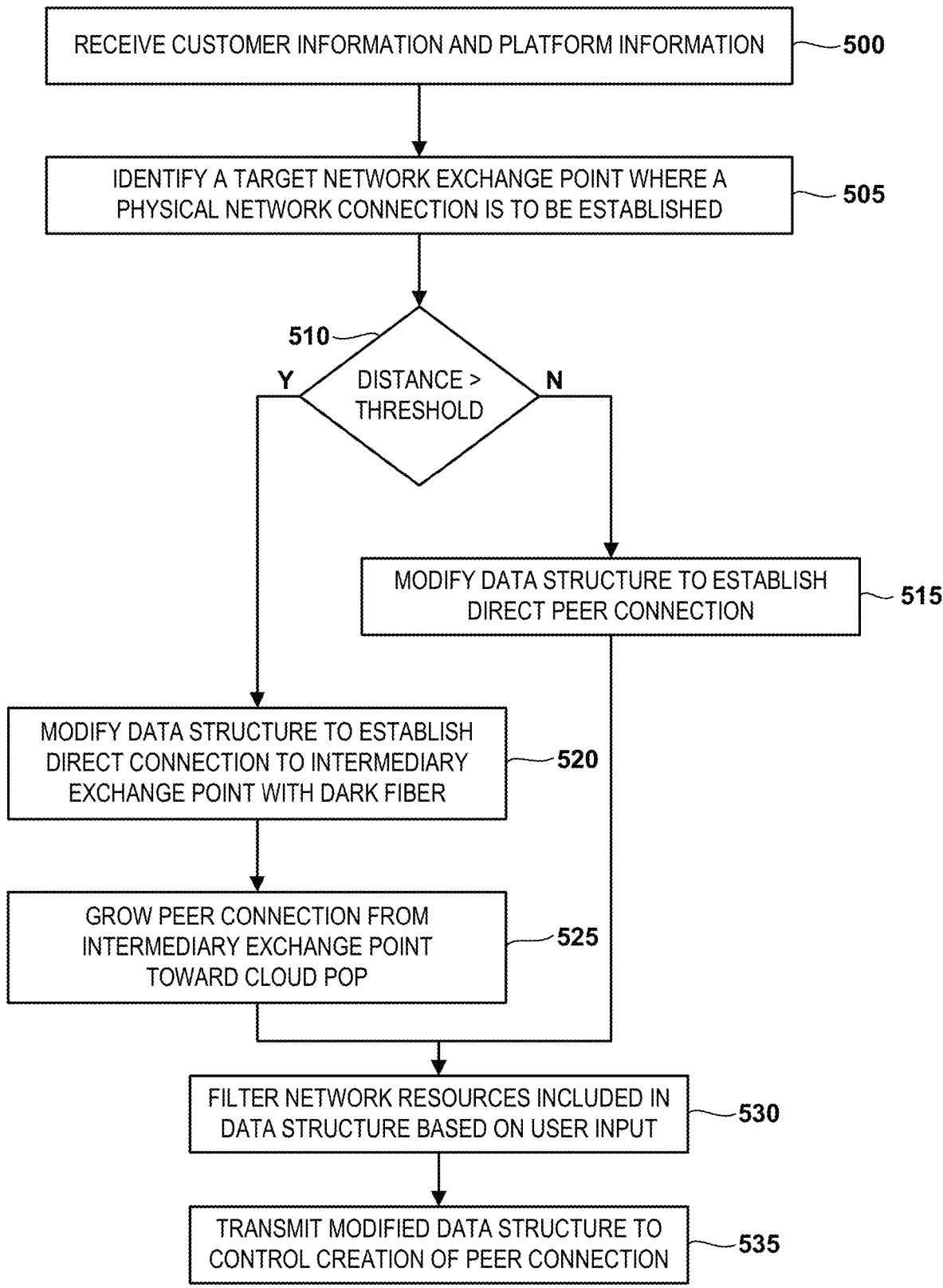
FIG. 5 is one embodiment of a flow diagram schematically depicting a method of identifying network resources available to form a peer connection between a customer terminal and a Cloud PoP.

In one embodiment, a method of identifying network resources available to form a peer connection between a customer terminal and a Cloud PoP is schematically illustrated in FIG. 5. Method 500 is implemented as part the peering system 300, in one embodiment. Customer information 340 indicative of the customer location 120 where the customer terminal 125 is located, and platform information 345 are received at block 500. The received platform information 345 identifies the multi-tenant platform 115 to which the customer terminal 125 is to be connected via the resulting peer connection 130, granting the customer terminal 125 access to a resource hosted by the multi-tenant platform 115.

Based on the received information, the analysis module 335 identifies, at block 505, the appropriate network exchange point 105 comprising network hardware where a physical network connection to the multi-tenant platform 115 is to be established. The physical connection completes the peer connection 130 on the side of the multi-tenant platform 115, and grants the customer terminal 125 access to one or more resources hosted by the multi-tenant platform 115. The network exchange point 105 nearest the customer location 120 can be identified by the analysis module 335 by comparing the proximity of each network exchange point 105 for the multi-tenant platform 115 to the customer location 120. The identified network exchange point 105 is stored in the data structure 325, optionally with the received customer information 340 and platform information 345.

Based, at least in part on the information stored in the data structure 325, the map module 350 determines whether a distance separating the network exchange point 105 from the customer location 120 exceeds a threshold at decision 510.

The threshold can be a defined distance (e.g., 20 miles), or a relative distance (e.g., the distance separating the customer location from an intermediary network exchange point). If not, the map module 350 modifies the data structure at block 515 to include a local, direct peer connection 130 between the network exchange point 105 at the Cloud PoP 100 and the customer terminal 125. The data structure 325 can also be modified to include an identity of a party to be contacted to allocate use of a portion of the dark fiber available at the customer location 120, and optionally contact information (e.g., phone number, email address, URL for a website, etc.) for the identified party.

A direct connection does not necessarily require an absence of intersecting branches in the fiber optic lines utilized to establish the peer connection 130. Instead, a direct peer connection does not include, but omits an intermediary network exchange point or PoP between the customer terminal 125 and the network exchange point 105 at the Cloud PoP 100. The rationale behind such a decision is that the distance separating the customer terminal 125 from the network exchange point 105 at the Cloud PoP 100 is short enough that dark fiber is available to bridge the gap, or can be installed without being cost prohibitive.

If it is determined that the distance exceeds the threshold at decision 510, the data structure is modified at block 520 to include a third-party network exchange point 140 or other such resource as an intermediary between the customer terminal 125 and the network exchange point 105 at the Cloud PoP 100. The data structure 325 is modified by including a dark fiber 155 (FIG. 1) between the third-party network exchange point 140 and the customer terminal 125.

The third-party network is then extended, or "grown," generally away from the customer terminal 125 toward the Cloud PoP 100 at block 525. Growth occurs in a direction from the intermediary network exchange point 140, generally toward the network exchange point 105 at the Cloud PoP 100 by successively adding third-party network resources to the peer connection 130. For example, a second intermediary PoP 150 housing another network exchange point can be included in the data structure 325 for the peer connection 130. The second intermediary PoP 150 can be operatively connected in the data structure 325 to the intermediary PoP 145 by dark fiber available between the two PoPs 145, 150.

The third-party network resources included in the peer connection 130 can be limited to private resources, and devoid of public or unsecured communication channels (e.g., the public Internet). Further, the filter 365 can optionally apply any performance information submitted via the performance interface 410 (FIG. 4) at block 530 to limit the network resources to those satisfying the user-defined criteria. Including the dark fiber 155 between the customer terminal 125 and the intermediary network exchange point 140 establishes a desired bandwidth and latency for the peer connection 130 without requiring a direct connection to the Cloud PoP 100.

At block 535, the modified data structure is transmitted over the network 320 to the requesting terminal 305 to control formation of the peer connection 130. For example, based on the modified data structure received, the requesting terminal 305 generates an interface to be displayed to a user. The interface can include information to be utilized to allocate at least some of the network resources (e.g., dark fiber, local PoP connection, etc.) to the peer connection 130. According to one embodiment, the interface can include an email address or telephone number for a party operating at least some of the network resources to be included, a URL or hyperlink to a website from where at least some of the network resources can be deployed, etc. The user can use the information included in the interface to form the peer connection 130.

According to another embodiment, the interface can include a selectable option allowing the portion of the network resources to be allocated to the peer connection 130 electronically, from within the interface (or from a website or portal launched in response to selection of the option). An order to allocate the portion of the network resources to the peer connection 130 can be submitted via an application programming interface ("API") to the third-party operator of the portion of the network resources.

Computing Device Embodiment

Figure 6:
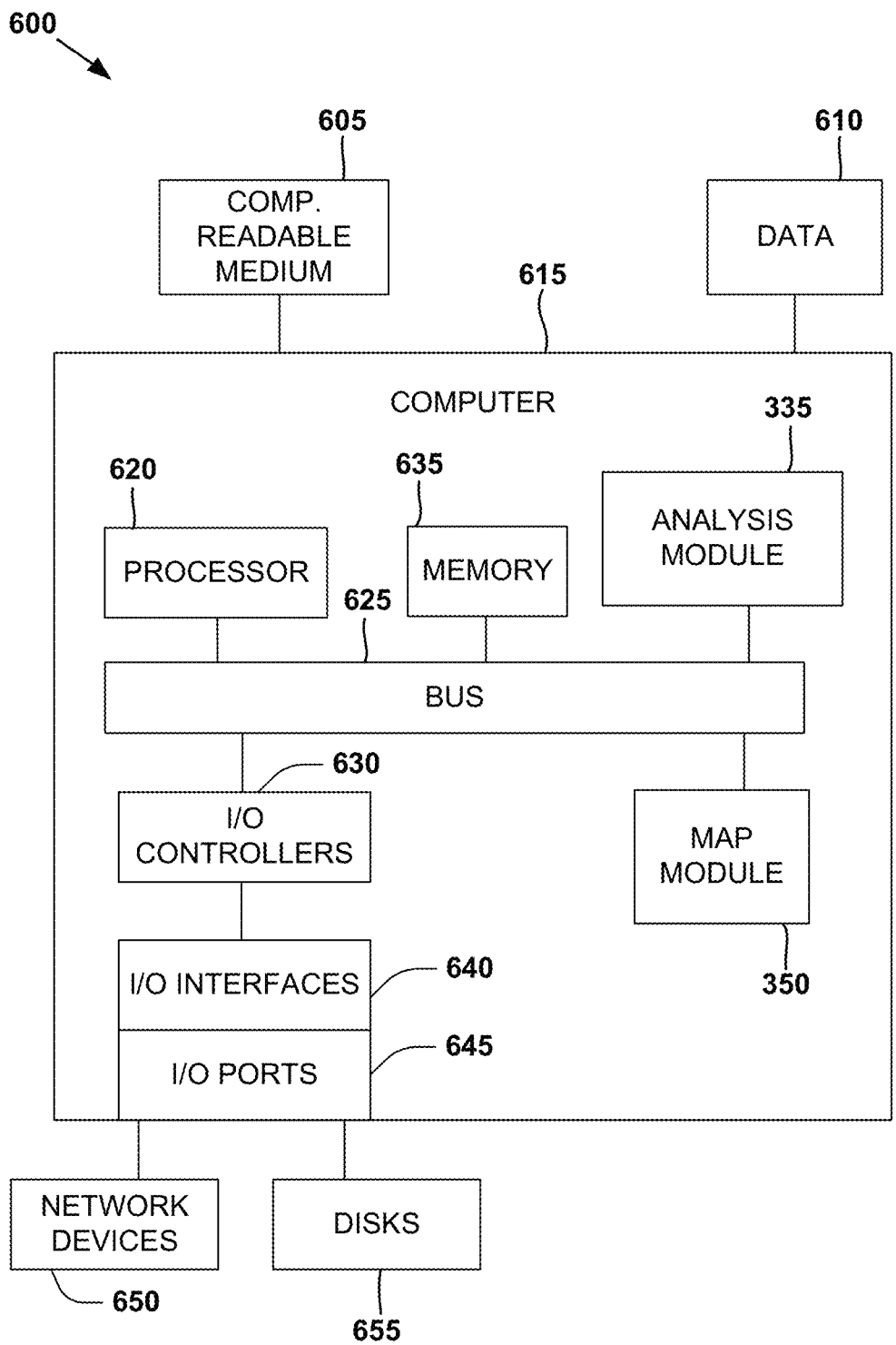
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 620, a memory 635, and input/output ports 645 operably connected by a bus 625. In one example, the computer 600 may include analysis module logic 335 and map module logic 350 configured to facilitate the creation of a peer connection similar to the peering system 300 shown in FIG. 3 and described above, and/or configured to implement and perform method 500, in one embodiment. In different examples, the logic 335, 350 may be implemented in hardware, a non-transitory computer-readable medium with stored instructions, firmware, and/or combinations thereof. While the logic 335, 350 is illustrated as hardware components attached to the bus 625, it is to be appreciated that in other embodiments, the logic 335, 350 could be implemented in the processor 620, stored in memory 635, or stored in disk 605.

In one embodiment, logic 335, 350 or the computer 600 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to create a peer connection as described herein. The means may also be implemented as stored computer executable instructions that are presented to computer 600 as data 610 that are temporarily stored in memory 635 and then executed by processor 620.

Logic 335, 350 may also provide means (e.g., hardware, non-transitory computer-readable medium that stores executable instructions, firmware) for performing a method of network peering as described herein.

Generally describing an example configuration of the computer 600, the processor 620 may be a variety of various processors including dual microprocessor and other multi-processor architectures. A memory 635 may include volatile memory and/or non-volatile memory. Non-volatile memory may include, for example, ROM, PROM, and so on. Volatile memory may include, for example, RAM, SRAM, DRAM, and so on.

A storage disk 655 may be operably connected to the computer 600 via, for example, an input/output (I/O) interface (e.g., card, device) 640 and an input/output port 645. The disk 655 may be, for example, a magnetic disk drive, a solid state disk drive, a floppy disk drive, a tape drive, a Zip drive, a flash memory card, a memory stick, and so on. Furthermore, the disk 655 may be a CD-ROM drive, a CD-R drive, a CD-RW drive, a DVD ROM, and so on. The memory 635 can store a process and/or a data 610, for example. The disk 655 and/or the memory 635 can store an operating system that controls and allocates resources of the computer 600.

The computer 600 may interact with input/output (I/O) devices via the I/O interfaces 640 and the input/output ports 645. Input/output devices may be, for example, a keyboard, a microphone, a pointing and selection device, cameras, video cards, displays, the disk 655, the network devices 650, and so on. The input/output ports 645 may include, for example, serial ports, parallel ports, and USB ports.

The computer 600 can operate in a network environment and thus may be connected to the network devices 650 via the I/O interfaces 640, and/or the I/O ports 645. Through the network devices 650, the computer 600 may interact with a network. Through the network, the computer 600 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
ROM: read only memory.
SQL: structured query language.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by at least a processor of a computing system, cause the computing system to:

receive, by at least the processor, a customer location where a customer terminal is located, and platform information;

determine, by at least the processor, whether a distance separating a network exchange point for the platform from the customer location exceeds a threshold;

if the distance does not exceed the threshold, modify a data structure to include a local network connection between the network exchange point and the customer terminal;

if the distance exceeds the threshold, modify the data structure to include a third-party network between the customer terminal and the network exchange point by: (i) including a local network connection between the third-party network and the customer terminal in the data structure, and (ii) progressively extending the third-party network generally away from the customer terminal in a direction toward the network exchange point; and transmit the modified data structure to a remote computer terminal to control creation of a peer connection between the multi-tenant platform and the customer terminal.

2. The non-transitory computer-readable medium of claim 1, wherein if the distance does not exceed the threshold, the peer connection between the network exchange point and the customer terminal is devoid of an intermediate network exchange point between the network exchange point and the customer terminal.

3. The non-transitory computer-readable medium of claim 1, wherein if the distance exceeds the threshold, the third-party network between the customer terminal and the network exchange point comprises an intermediate network exchange point between the network exchange point and the customer terminal.

4. The non-transitory computer-readable medium of claim 1, further comprising instructions that when executed by at least the processor cause the computing system to:

receive, by at least the processor, a bandwidth requirement of the customer terminal to access the resource hosted by the multi-tenant platform; and limit the third-party network between the customer terminal and the network exchange point to include network resources that satisfy the bandwidth requirement.

5. The non-transitory computer-readable medium of claim 1, further comprising instructions that when executed by at least the processor cause the computing system to:

determine a network latency expected to be experienced by communications over the peer connection; and modify the data structure to include the determined network latency in a manner that facilitates a comparison of the determined network latency with a latency threshold to allow the peer connection to exhibit a limited network latency.

6. The non-transitory computer-readable medium of claim 1, further comprising instructions that when executed by at least the processor cause the computing system to identify, by at least the processor, an underutilized fiber optic line accessible from the customer location, wherein if the distance exceeds the threshold, allocating the underutilized fiber optic line for use in establishing the local network connection between the third-party network and the customer terminal.

7. The non-transitory computer-readable medium of claim 1, wherein the modified data structure transmitted to the remote computer terminal, when processed by the remote computer terminal, causes the remote computer terminal to generate a display, the display including: (i) a service provider that operates an underutilized fiber optic line that is accessible from the customer location, or (ii) an operator of an intermediate network exchange point between the network exchange point and the customer terminal, wherein the peer connection includes the intermediate network exchange point.

8. The non-transitory computer-readable medium of claim 1, wherein the threshold comprises a distance separating the customer location from a second network exchange point that is locally accessible over a fiber optic line from the customer location.

9. A computing system, comprising:

at least one processor connected to at least one memory;

an analysis module stored on a non-transitory computer readable medium and including instructions that when executed by at least the at least one processor cause the computing system to:

receive, by at least the processor:
(i) a customer location where a customer terminal is located, and
(ii) platform information identifying a multi-tenant platform to which the customer terminal is to be connected to grant the customer terminal access to a resource hosted by the multi-tenant platform;

store, by at least the processor, the received customer information associated with the received platform information in a data structure; and identify, by at least the processor, a network exchange point comprising network hardware where a physical network connection to the multi-tenant platform is to be established for the customer terminal; and a map module stored on the non-transitory computer readable medium and including instructions that when executed by at least the at least one processor cause the computing system to:

determine, by at least the processor, whether a distance separating the network exchange point from the customer location exceeds a threshold;

if the distance does not exceed the threshold, modify the data structure to include a local network connection between the network exchange point and the customer terminal;

if the distance exceeds the threshold, modify the data structure to include a third-party network between the customer terminal and the network exchange point by: (i) including a local network connection between the third-party network and the customer terminal in the data structure, and (ii) progressively extending the third-party network generally away from the customer terminal in a direction toward the network exchange point; and transmit the modified data structure to a remote computer terminal to control creation of a peer connection between the multi-tenant platform and the customer terminal.

10. The computing system of claim 9, wherein the map module omits an intermediate network exchange point between the network exchange point and the customer terminal from the peer connection in response to determining that the distance does not exceed the threshold.

11. The computing system of claim 9, wherein the map module causes an intermediate network exchange point to be arranged between the network exchange point and the customer terminal in response to determining that the distance exceeds the threshold.

12. The computing system of claim 9, wherein the map module further includes instructions that when executed by the at least one processor cause the computing system to:

receive, by the at least one processor, a bandwidth requirement of the customer terminal to access the resource hosted by the multi-tenant platform; and limit the third-party network between the customer terminal and the network exchange point to include network resources that satisfy the bandwidth requirement.

13. The computing system of claim 9, wherein the map module further includes instructions that when executed by the at least one processor cause the computing system to:

determine a network latency expected to be experienced by communications over the peer connection; and modify the data structure to include the determined network latency in a manner that facilitates a comparison of the determined network latency with a latency threshold to allow the peer connection to exhibit a limited network latency.

14. The computing system of claim 9, wherein the map module further includes instructions that when executed by at least the processor cause the processor to identify, by at least the processor, an underutilized fiber optic line accessible from the customer location, wherein if the distance exceeds the threshold, allocating the underutilized fiber optic line for use in establishing the local network connection between the third-party network and the customer terminal.

15. The computing system of claim 9, wherein the modified data structure transmitted to the remote computer terminal causes the remote computer terminal to generate a display, wherein the display includes: (i) a service provider that operates an underutilized fiber optic line that is accessible from the customer location, or (ii) an operator of an intermediate network exchange point between the network exchange point and the customer terminal that is included in the peer connection.

16. The computing system of claim 9, wherein the threshold comprises a distance separating the customer location from a second network exchange point that is locally accessible over a fiber optic line from the customer location.

17. A computer-implemented method, the method comprising:

receiving, by at least a processor:
(i) a customer location where a customer terminal is located, and
(ii) platform information identifying a multi-tenant platform to which the customer terminal is to be connected to grant the customer terminal access to a resource hosted by the multi-tenant platform;

storing, by at least the processor, the received customer information associated with the received platform information in a data structure;

identifying, by at least the processor, a network exchange point comprising network hardware where a physical network connection to the multi-tenant platform is to be established for the customer terminal;

determining, by at least the processor, whether a distance separating the network exchange point from the customer location exceeds a threshold;

if the distance does not exceed the threshold, modifying, by at least the processor, the data structure to include a local network connection between the network exchange point and the customer terminal;

if the distance exceeds the threshold, modifying, by at least the processor, the data structure to include a third-party network between the customer terminal and the network exchange point by: (i) including a local network connection between the third-party network and the customer terminal in the data structure, and (ii) progressively extending the third-party network generally away from the customer terminal in a direction toward the network exchange point; and transmitting, by at least the processor, the modified data structure to a remote computer terminal to control creation of a peer connection between the multi-tenant platform and the customer terminal.

18. The computer-implemented method of claim 17, wherein if the distance does not exceed the threshold, modifying the data structure comprises omitting an intermediate network exchange point between the network exchange point and the customer terminal from the peer connection.

19. The computer-implemented method of claim 17, wherein if the distance exceeds the threshold, modifying the data structure comprises including an intermediate network exchange point between the network exchange point and the customer terminal in the third-party network.

20. The computer-implemented method of claim 17 further comprising identifying, by at least the processor, an underutilized fiber optic line accessible from the customer location, wherein if the distance exceeds the threshold, allocating the underutilized fiber optic line for use in establishing the local network connection between the third-party network and the customer terminal.

* * * * *

UNITED STATES PATENT AND TRADEMARK OFFICE
CERTIFICATE OF CORRECTION

PATENT NO. : 10,764,363 B2
APPLICATION NO. : 16/256155
DATED : September 1, 2020
INVENTOR(S) : Hill et al.

It is certified that error appears in the above-identified patent and that said Letters Patent is hereby corrected as shown below:

In the Claims

In Column 14, Line 13, in Claim 9, delete "by at least" and insert -- by --, therefor.

In Column 14, Line 32, in Claim 9, delete "by at least" and insert -- by --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*